United States Patent [19]
DeCoux

[11] Patent Number: 5,484,221
[45] Date of Patent: Jan. 16, 1996

[54] PANEL MOUNTING SYSTEM

[75] Inventor: Steven P. DeCoux, Long Beach, Calif.

[73] Assignee: Rockwell International Corp., Seal Beach, Calif.

[21] Appl. No.: 206,691

[22] Filed: Mar. 7, 1994

[51] Int. Cl.$^6$ .................. F16B 1/00; B64C 1/12
[52] U.S. Cl. ............ 403/203; 244/123; 244/131; 403/6; 403/11; 403/12; 403/220; 403/291; 403/404; 403/DIG. 10
[58] Field of Search ................... 403/6, 11, 12, 403/24, 26, 202, 203, 220, 223, 265, 268, 291, 404, 406.1, DIG. 10; 244/123, 124, 131, 132

[56] References Cited

U.S. PATENT DOCUMENTS

| | | | |
|---|---|---|---|
| 4,226,068 | 10/1980 | Wadsworth | 403/6 X |
| 4,247,219 | 1/1981 | Ausprung | 403/406.1 |
| 4,296,899 | 10/1981 | Isenberg | 244/132 X |
| 4,556,592 | 12/1985 | Bannink, Jr. | 403/24 X |
| 4,667,906 | 5/1987 | Suárez et al. | 244/124 |
| 4,678,150 | 7/1987 | Newman et al. | 403/268 X |
| 4,705,425 | 11/1987 | Okawa | 403/406.1 X |
| 5,158,388 | 10/1992 | Ruf | 403/24 |
| 5,249,878 | 10/1993 | Frumkin | 403/291 |
| 5,261,759 | 11/1993 | Decoux | 403/408.1 |

FOREIGN PATENT DOCUMENTS 1668749  8/1991  U.S.S.R. .................. 403/6

*Primary Examiner*—Brian K. Green
*Assistant Examiner*—Andrea Chop
*Attorney, Agent, or Firm*—Charles T. Silberberg

[57] ABSTRACT

A fastening system for securing modular panels to an underlying support structure. The fastening system includes a number of pad members, preferably made of foamed material, secured to the underside of each panel, and a saw-like apparatus carried by the pad members for severing the pad members from the vehicle structure. One side of each of the pad members is secured to the panel underside. The other side of each pad member is secured to an appropriate location on the vehicle structure in such a manner that the outer surface of the panel, when the panel is properly secured on the vehicle body, lies flush with the outer surface of the vehicle body.

16 Claims, 5 Drawing Sheets

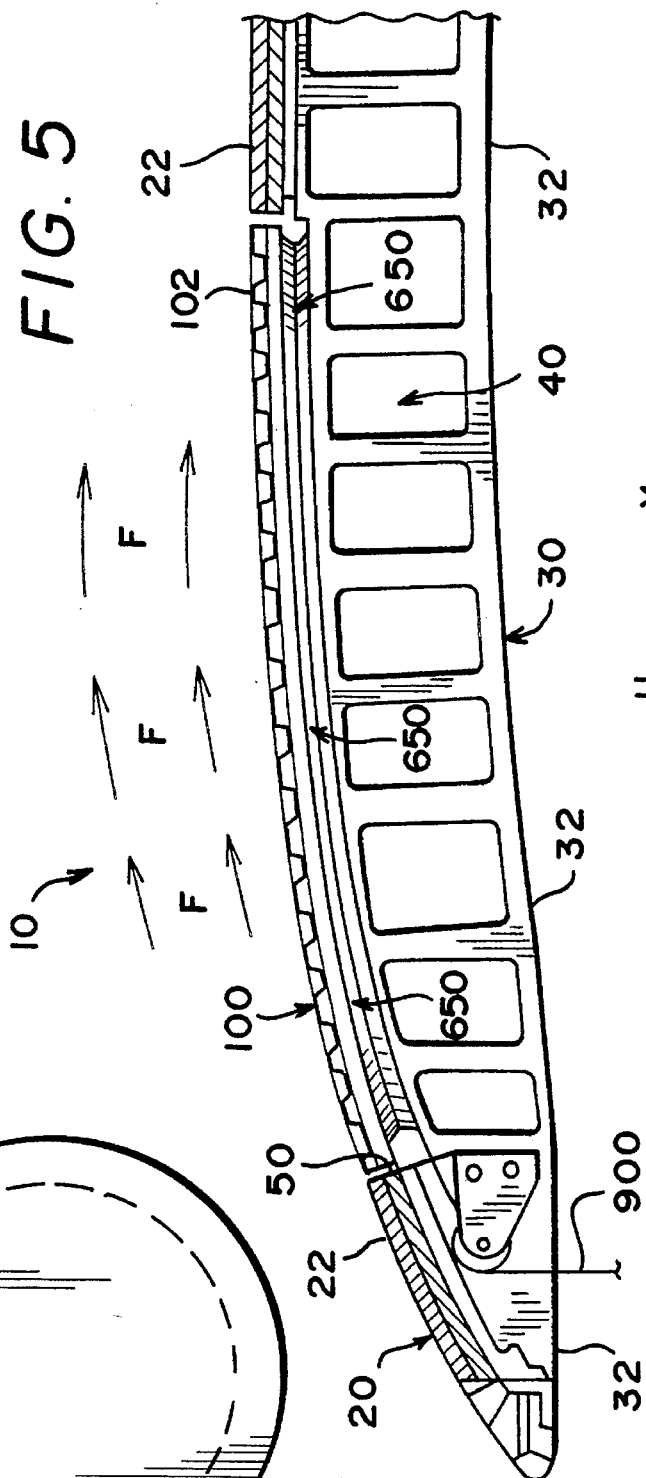
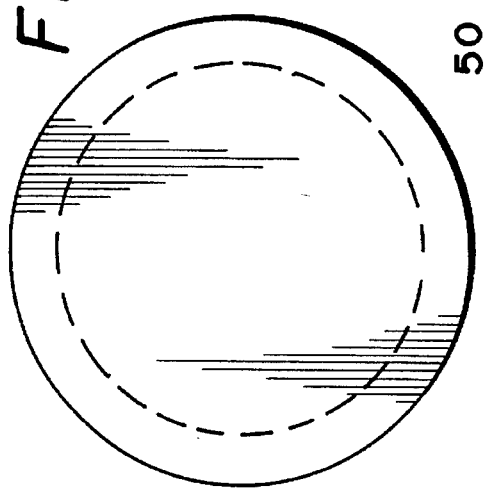
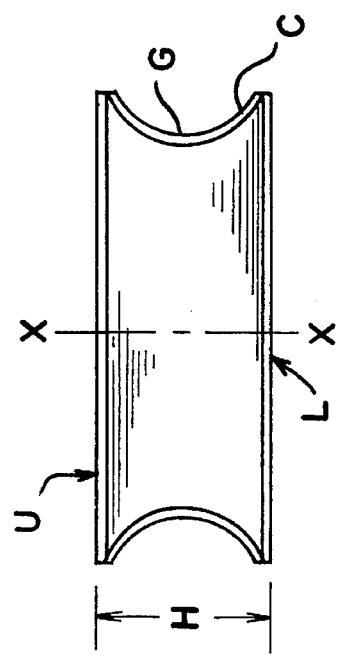

PANEL MOUNTING SYSTEM

BACKGROUND OF THE INVENTION

1. Field of the Invention

The present invention relates to modular panels and apparatus for securing the panels to underlying structure, and more particularly to apparatus for securing, removing and accurately resecuring modular panels bearing fluid flow instrumentation or control mechanisms at the outer surface of a vehicle.

2. Description of the Related Art

In the art of fluid flow measurement, testing or control, there are many occasions in which it is desirable to secure instruments or control devices, such as probes, sensors, or other instrumentation, to a structure immersed in a fluid flow. Such instruments or control devices often are mounted on modular panels which cover, or hinder access to, equipment located within the structure and to which access is often necessary.

One type of modular panel which has proven very useful in controlling fluid flow over and around surfaces immersed in a variety of fluid environments, especially in the case of aircraft, automobile, or other vehicle surfaces, is the laminar flow control (LFC) panel.

Attachment of such panels via conventional fasteners has, so far, proven unacceptable. As has become well known in the art, modular LFC panels cannot be properly secured with conventional fasteners because such fasteners, when fully seated in the panel, fail to prevent the surface interruptions or discontinuities which result in undesired turbulence.

One such non-conventional fastener is known which can secure LFC panels to underlying supports while eliminating undesired turbulence. This fastener (disclosed in U.S. Pat. No. 5,261,759 to Decoux and assigned to the present assignee) includes a first, intermediate, flange portion for securing the LFC panel to an underlying support, and an end flange for engaging an outer surface of the LCF panel to seal regions within the panel from fluid flowing outside. When properly seated, surfaces of the fastener and the panel are flush with one another thereby eliminating turbulence.

Other fastening techniques for securing the panels which carry such instrumentation or control devices to a structure, such as a vehicle body, have included permanent bonding directly to the vehicle structure using epoxy adhesives, polysulfide or polyurethane bonding agents. Such panels essentially have to be destroyed in order to achieve removal of the panels from the vehicle structure.

Usually, the panels carrying the experimental instrumentation must be bonded over critical vehicle equipment. Failure in any region of attachment of the panels to the vehicle body would require cancellation of the experiment, a result which would prove extremely costly and time-consuming.

Moreover, when securing modular panels of this type on vehicle bodies, one concern is how rigidly the panels are maintained at their place of attachment. Another concern is how precisely the panels are located, or relocated after removal, over the region of the vehicle body to be covered.

It would therefore be desirable to have a fastening system which would enable quick and facile removal and reattachment of these modular panels to a vehicle body, and which would still prevent discontinuities at the surface of the modular panel immersed in the fluid flow.

OBJECTS AND SUMMARY OF THE INVENTION

It is, therefore, a principal object of the present invention to provide a novel fastening method and system for removably attaching a modular panel to a surface, which at the same time will overcome all the deficiencies and drawbacks of currently known fastening methods and systems of like kind.

Another object of the present invention is to provide a novel quick-fastening system for an aerodynamically-configured fluid flow control, or instrumentation, panel for aircraft or other vehicle structures ordinarily immersed in a flowing fluid field.

These and other objects are achieved by the present invention, which is a novel fastening system for securing modular panels to underlying support structure, especially vehicle body structure. The fastening system includes a plurality of pad members, preferably made of foamed material, secured to the underside of each panel, and means carried by the pad members for severing the pad members from the vehicle structure. One side of the pad members is secured to the panel underside; the other side of the pad member is secured to an appropriate location on the vehicle structure in such a manner that the outer surface of the panel, when the panel is properly secured on the vehicle body, lies flush with the outer surface of the vehicle body. The pad members may be embodied as doughnut-shaped shells or as elongated rib members. Both embodiments of the pad member include a reduced thickness mid-section for housing a wire-saw or similar means for effecting separation of the pad member from the vehicle body.

BRIEF DESCRIPTION OF THE DRAWINGS

FIG. 3 illustrates a side sectional view of one pad member used to secure the modular panel shown in FIG. 2 to the vehicle body structure.

FIG. 4 is a top view of the pad member shown in FIG. 3.

FIG. 5 illustrates, in cross-sectional view, vehicle body structure and a modular panel secured to the vehicle body structure by a second embodiment of the pad member.

DETAILED DESCRIPTION OF THE PREFERRED EMBODIMENTS

Figure 1:
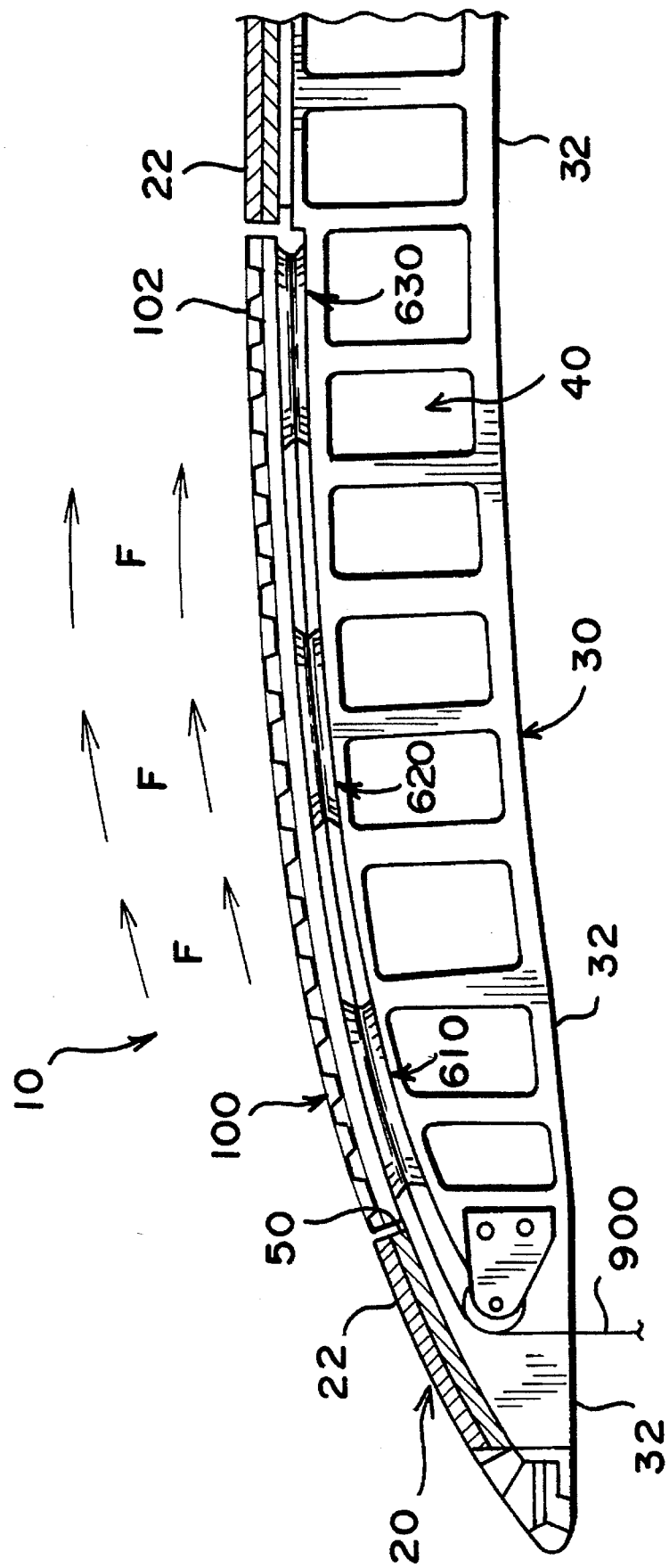
FIG. 1 illustrates, in cross sectional view, vehicle body structure and a modular panel secured to the vehicle body structure by one embodiment of the pad member.

Similar elements of parts in the various figures of the drawings are designated by the same or similar reference characters.

Figure 2:
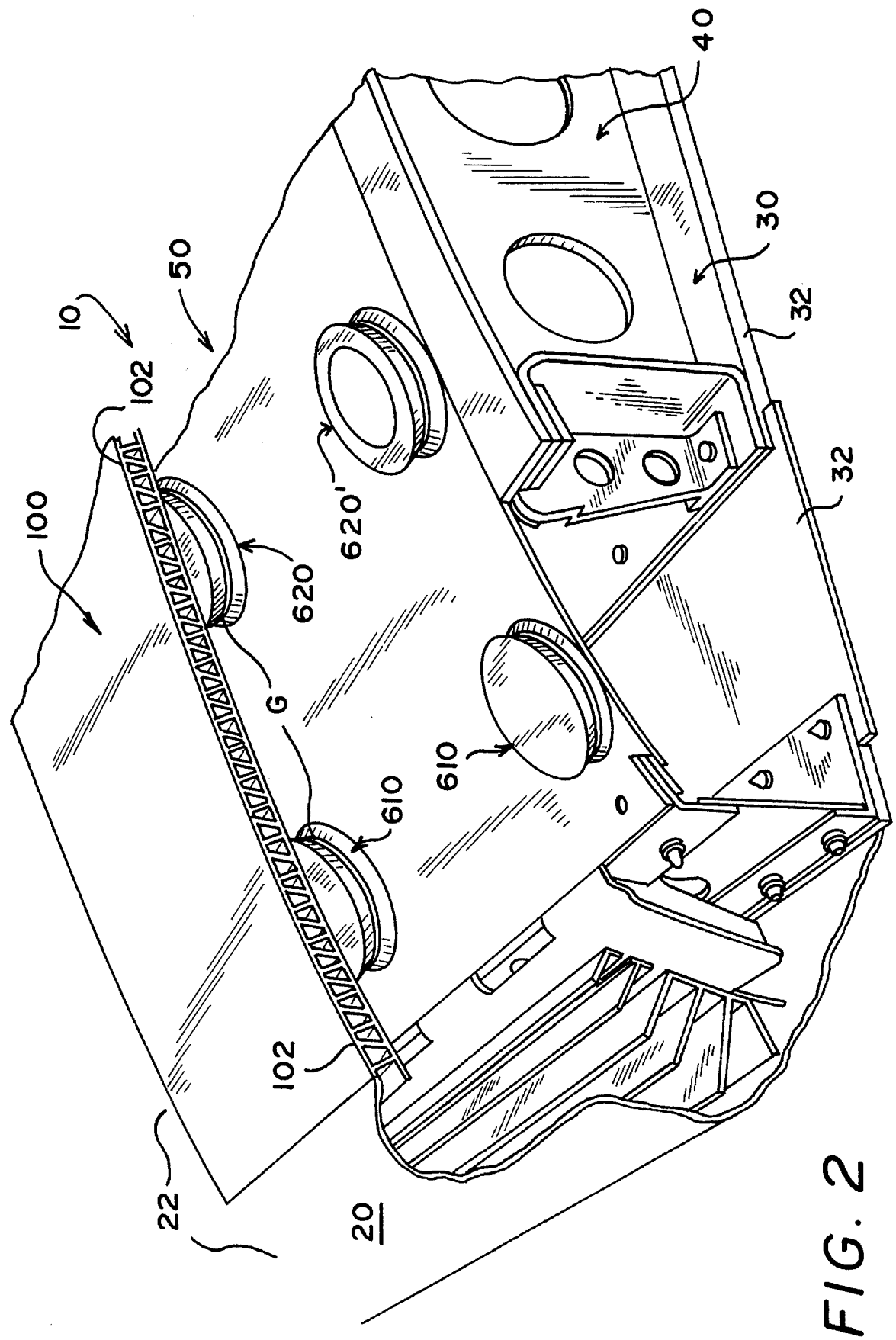
FIG. 2 is a perspective view of the panel, vehicle body structure and pad members shown in FIG. 1.

Referring first to FIGS. 1–4 of the drawings, FIGS. 1 and 2 show a body structure 10 having an upper surface-defining member 20 and a lower surface-defining member 30. Body 10 is intended to be immersed in a fluid F (see FIG. 1) which flows over the upper skin 22 of member 20.

A support assembly 40 is arranged internally within the body structure and cooperates with the upper and lower skins 22, 32 to maintain the integrity of the body structure shape. The support assembly 40 may take the form of a truss core structure, a honeycomb structure, a plurality of beam-like members, or any other structural arrangement capable of supporting loads to be sustained by the body 10.

As shown in FIGS. 1 and 2, upper skin 22 is seated against and secured to the upper edge of the support assembly 40 while the lower skin 32 is seated against and secured to the lower edge of the support assembly.

An opening or recess 50 is formed in the upper skin 22 atop the support assembly 40. A modular panel member 100 is provided which is disposed within the recess and secured atop the support assembly 40. The depth or thickness of the modular panel is taken into consideration in designing the depth of the recess. The modular panel 100 is preferably of a construction which is typically used for panels in a similar environment, as for example a truss core or a honeycomb structure, and most preferably is of the same construction as the upper skin 22. The present invention contemplates fabricating the modular panel of metal, composite materials, or a combination of such materials, and exemplary dimensions of the modular panel member 100 as envisioned by the present invention are on the order of about 25 feet by about 20 feet by about 3 inches, although other dimensions of like magnitude are possible.

Secured to the bottom of the modular panel member 100 shown in FIG. 1 are pad members 610–630 which are arranged in an array that facilitates secure attachment of the panel member 100 to the upper surface of the support assembly in the recess 50. These pad members are fashioned out of a composition of high density foam and composite fibrous material, such as fiberglass, and will be described in greater detail below.

When the modular panel member 100 is secured in the recess 50, the upper surface 102 of the panel member at adjacent regions of the upper skin 22 lies flush with, and is disposed at the same height as, the upper skin 22 relative to the lower skin 32. The pad members 610–630 may be secured by, for example, gluing the pad embers 610–630 to the panel member 100 and the lower surface-defining member 30.

Two embodiments of pad members are contemplated by the present invention, although other variations on the configuration of the pad members are possible. A first embodiment shown in FIGS. 1–4 comprises doughnut-shaped elements which are designated with reference numerals 610–630. A second embodiment shown in FIGS. 5–8 comprises elongated, substantially rectangular rib elements which are designated with reference numerals 650–670.

Referring now to FIGS. 2–4, there is a detailed illustration of the doughnut-shaped elements 610–630 of the first embodiment. As shown in detail in FIGS. 3–4, these elements are preferably solid and substantially cylindrical in configuration. Each element has an axis of revolution X-X, an upper solid face U covering the upper end region of the element, and a lower solid face L covering the lower end region of the element. At substantially the middle of the cylindrical height H of the element is a shallow groove G of narrow width which encompasses the entire periphery of the element. A coating C of a fibrous material, such as fiberglass, is provided on the side walls of the element between the upper and lower faces. This coating can be formed of one or more layers of the material, and acts to strengthen the element against compressive failure in its panel supporting capacity. One variation of these elements shown in FIG. 2 at 620' is a substantially hollow pad member without the solid upper face U or the solid lower face L; all other features are contemplated. The high density foam material of which it is formed acts as a cushioning mechanism for damping out or even eliminating undesirable vibrations.

When the pad members of FIGS. 1–4 are adhered to the underside of the modular panel member 100 in the array shown in FIG. 2, the grooves G are aligned in a longitudinal manner relative to the upper surface of the underlying support structure, and a cutting device 900 (see FIG. 1) can be positioned and retained in the grooves G of the aligned elements. This cutting device, exemplified as a wire saw, enables detachment of the modular panel member 100 after the latter has been secured in place (e.g., in the event that some mechanisms, plumbing, or wiring beneath the panel member needs repair or replacement) by the simple gripping of opposite ends of the wire saw followed by the moving of one end of the saw back and forth (i.e., forwardly and then rearwardly) over and over as needed. As the saw is reciprocated within the grooves G of the pad members, the teeth of the wire saw are forced into engagement with the pad member sidewalls and are caused to cut through the pad members starting at and being guided by the grooves G.

Referring now to FIGS. 5–8, there is a detailed illustration of the elongated rib-like elements 650–670 of the second embodiment. As shown in detail in FIGS. 6–8, these elements are preferably solid and substantially rectangular in configuration. Each element includes a longitudinal axis Y-Y along the length of the element, an upper solid face UU covering the upper end region of the element, and a lower solid face LL covering the lower end region of the element. A shallow groove GG is provided at substantially the middle of the rib element's height HH. This groove GG has a narrow width which encompasses the entire outer periphery of the side wall of the element. A coating C of a fibrous material, such as fiberglass, is provided on the side wall of the element between the upper and lower faces. This coating can be formed of one or more layers of the fibrous material, and acts to strengthen the element against compressive or crushing failure in its panel supporting capacity.

A variation of the elements shown in FIGS. 5–8 is a substantially hollow pad member without the solid upper face UU or the solid lower face LL; all other features are contemplated. The high density foam material of which it is formed acts as a cushioning mechanism for damping out or even eliminating undesirable vibrations.

Figure 6:
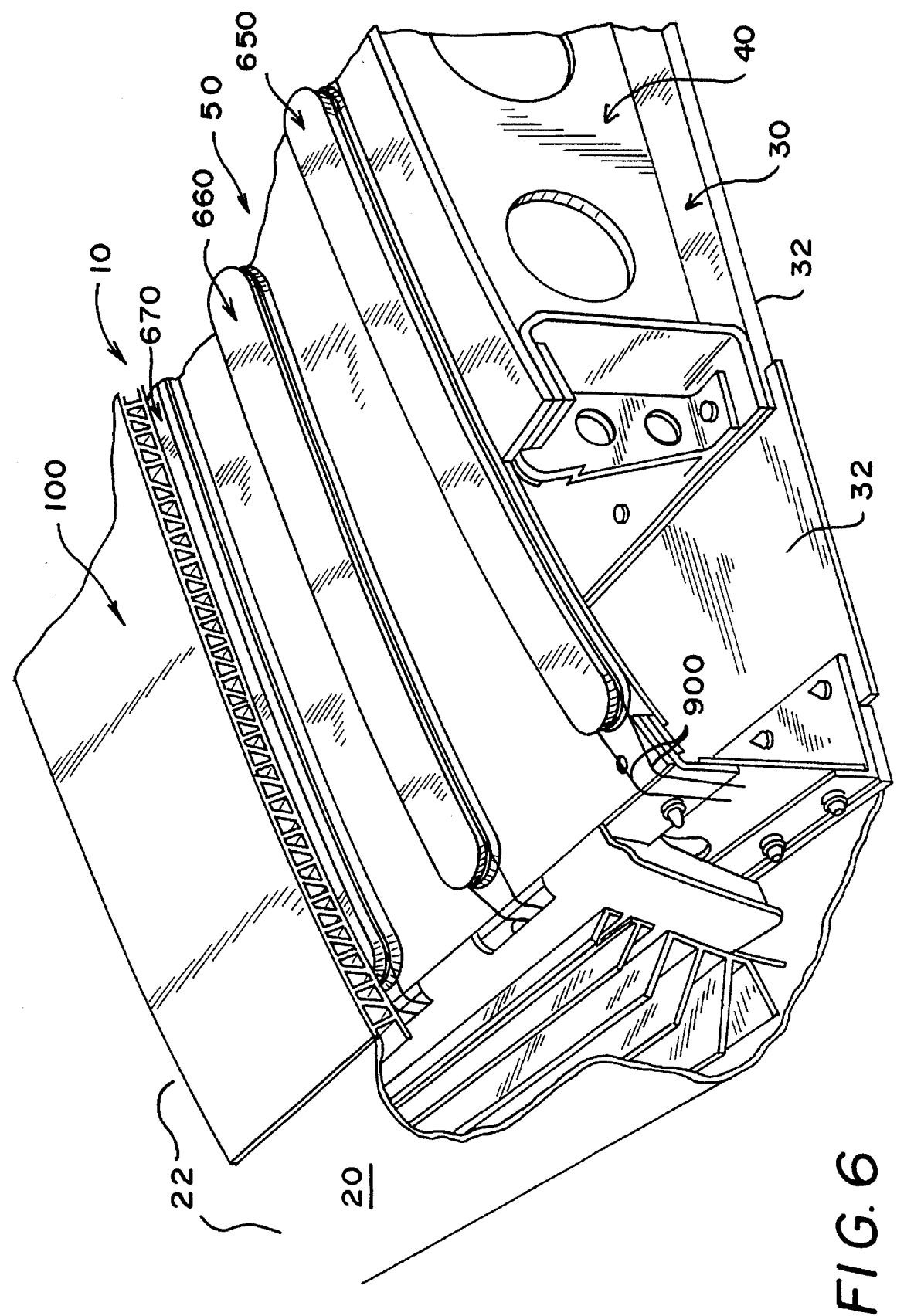
FIG. 6 is a perspective view of the panel, vehicle body structure and pad members shown in FIG. 5.
Figure 8:
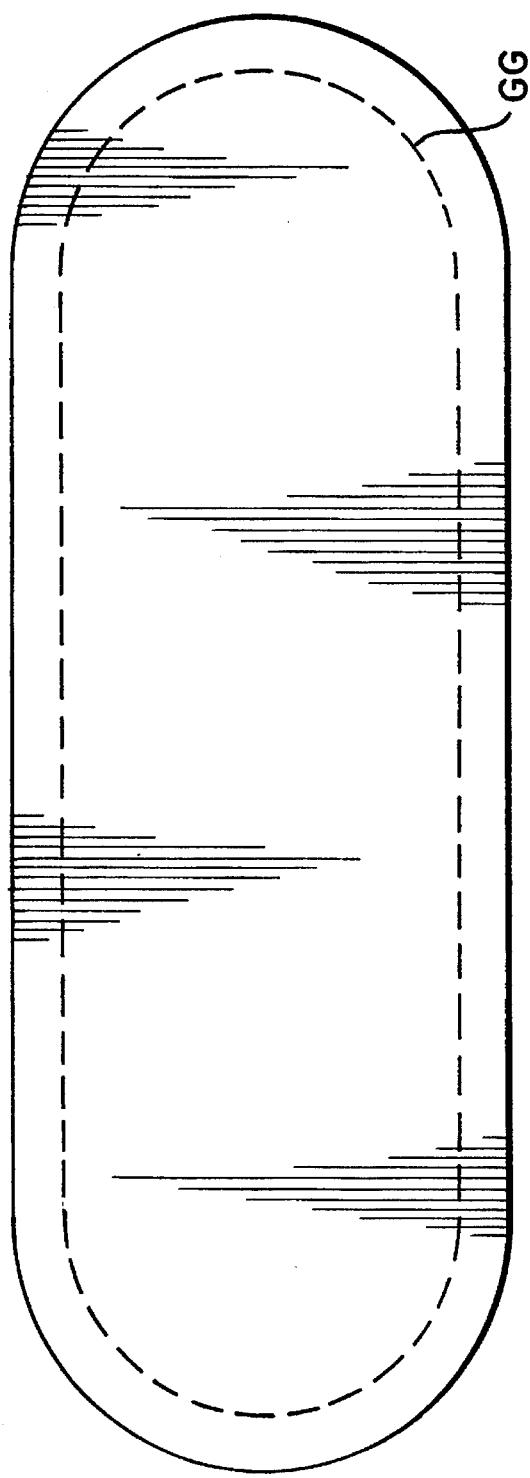
FIG. 8 is a top view of the pad member shown in FIG. 7.
Figure 7:
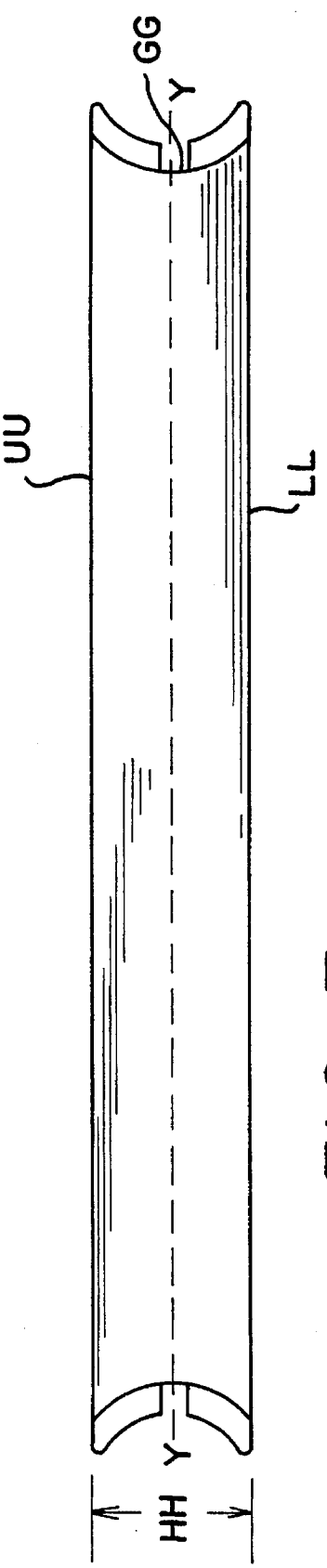
FIG. 7 illustrates a side sectional view of one pad member used to secure the modular panel shown in FIG. 5 to the vehicle body structure.

When the elements of FIGS. 5–8 are adhered to the underside of the modular panel member 100 in the array shown in FIG. 6, the grooves GG, which extend in a longitudinal manner, are provided with a cutting device 900 (see FIGS. 5 and 6) which is supported in the groove GG of the respective element. This cutting device, exemplified as a wire saw, enables detachment of the modular panel member 100 after the latter has been secured in place (e.g., in the event that some mechanisms, plumbing, or wiring below the panel member needs repair or replacement) by simple gripping of opposite ends of the wire saw and the moving back and forth of one of the ends. In a manner similar to that described above, as the saw is reciprocated within the grooves GG of these pad members, the teeth of the wire saw are forced into engagement with the pad member sidewalls and cut through the pad members at the grooves GG.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A system of pad members in combination with a panel member and an underlying support structure, each said pad member being disposed adjacent a facing surface of the underlying support structure and comprising:

(a) a first surface secured to a portion of a first side of said panel member, a second surface configured to be secured to a portion of said facing surface, and a medial region located between said first and second surfaces for structurally maintaining said first and second surfaces in a non-intersecting relationship, (b) means, carried by said medial region of said pad member, for separating said first surface from said second surface at a desired time after said second surface has been secured to said facing surface wherein said pad members are arranged in a linear array on said first side of said panel member and wherein said means for separating said first surface from said second surface are interconnected with one another to form a single mechanism for effecting severance of said panel member from said underlying support structure.

2. The system pad of members of claim 1, wherein said pad member is glued to said facing surface.

3. A pad member in combination with a panel member and an underlying support structure, said pad member being disposed adjacent a facing surface of the underlying support structure and comprising:

(a) a first surface secured to a portion of a first side of said panel member, a second surface configured to be secured to a portion of said facing surface, and a medial region located between sad first and second surfaces for structurally maintaining said first and second surfaces in a non-intersecting relationship, (b) means, carried by said medial region of said pad member, for separating said first surface from said second surface at a desired time after said second surface has been secured to said facing surface, wherein said pad member consists primarily of a foamed material.

4. The pad member of claim 3, wherein at least one layer of fiberglass covers said foamed material.

5. The pad member of claim 3, wherein said medial region comprises a reduced thickness wall portion comprising a groove.

6. The pad member of claim 5, wherein said groove extends around the entire peripheral extent of said pad member.

7. The pad member of claim 6, wherein the means for separating the first surface from the second surface includes cutting means disposed in said groove.

8. The pad member of claim 7, wherein said cutting means comprises a wire saw, and said groove keeps said wire saw from cutting through or otherwise damaging said panel member or underlying support structure.

9. Apparatus in combination with a structural panel and one surface of a vehicle body comprising:

a plurality of mounting elements secured to an underside of said structural panel, each of said mounting elements having a wall of predetermined height, a width of a dimension substantially greater than said height, a top surface and a bottom surface, the wall of predetermined height having an exterior groove at a mid-height location.

10. The apparatus of claim 9, wherein each of said mounting elements further have a substantially cylindrical peripheral configuration.

11. The apparatus of claim 9, wherein each of said mounting elements further have a substantially rectangular peripheral configuration.

12. The apparatus of claim 9, wherein each of said mounting elements are substantially solid, and are made from foamed material which acts as a cushioning mechanism.

13. A fastening system in combination with a panel member and an underlying support structure, comprising:

a plurality of cushioning elements having an upper portion bonded to an underside of said panel member and a lower portion bonded to the underlying support structure, said cushioning elements carrying means for separating said upper portion front said lower portion wherein each of said cushioning elements is made from a foamed material.

14. A fastening system in combination with a panel member and an underlying support structure, comprising:

a plurality of cushioning elements having an upper portion bonded to an underside of the panel member and a lower portion bonded to the underlying support structure, said cushioning elements carrying means for separating said upper portion from said lower portion, wherein said cushioning elements are arranged in an array which enables the separating means of at least two adjacent cushioning elements to be formed as a single element.

15. The fastening system of claim 14, wherein said separating means is a wire saw.

16. Test panel apparatus for use with an aerodynamically immersed vehicular structure, comprising:

a test panel, means for mounting said test panel on a support of said vehicular structure, said mounting means having a lower portion adapted to be bonded to a surface of said vehicular structure support and an upper portion bonded to said test panel, and said mounting means bearing means for severing the upper portion of said mounting means from the lower portion of said mounting means.

* * * * *